Patented Jan. 10, 1928.

1,655,504

UNITED STATES PATENT OFFICE.

WILLIAM HOFFMAN KOBBÉ, OF NEW YORK, N. Y., ASSIGNOR TO TEXAS GULF SULPHUR COMPANY, OF BAY CITY, TEXAS, A CORPORATION OF TEXAS.

COLORED SULPHUR.

No Drawing.   Application filed October 10, 1925. Serial No. 61,831.

This invention relates to a method of coloring sulphur, colored sulphur products and the utilization thereof for the various purposes for which such materials are adapted.

The natural color of sulphur varies from a grayish yellow to a bright yellow or orange, depending upon the degree of refinement and purity and the crystalline structure. Refined sulphur possesses a characteristic yellow color which is, however, very readily modified by the presence of impurities such as a very slight trace of oil which frequently occurs in crude sulphur.

In many applications for sulphur in the arts it is most desirable to change its color from the bright yellow of refined sulphur, or the grayish yellow of crude, to other shades. Attempts have been made to admix various pigments and other coloring matter with molten sulphur but there are many difficulties encountered in doing this and the results are unsatisfactory for the following reasons. Many mineral pigments react chemically with sulphur, which not only destroys their coloring action but produces a porous and brittle mass frequently having the objectionable odor of hydrogen sulphide or that of other reaction products. Furthermore, the specific gravity of many of these pigments or other coloring matters differs from that of molten sulphur so that it is impossible to keep them in suspension.

Carbon black, graphite and other carbonaceous materials will impart a black color to molten sulphur if used in sufficient quantities. Similarly, the various red oxides of iron, antimony sulfid, ultramarine blue and other pigments will color molten sulphur to a certain degree. Some of these coloring matters, notably carbon black or graphite, are fairly satisfactory to color sulphur black and for the casting of art objects either from elemental sulphur or a sulphur composition. Comparatively large quantities of these pigments or coloring matters must be used in order to completely obscure the natural yellow color of sulphur. These pigments and coloring matters are not satisfactory, however, when the sulphur is used as an impregnant for the treating of various porous materials because of their insolubility in molten sulphur and the fact that they filter out and remain on the surface of the materials treated. For example, carbon black in a comminuted and very fine state of subdivision will not enter such materials as limestone, sandstone, concrete or wood pulp sheets, but remains on the surface in a more or less dry state.

A small quantity of any hydrocarbon oil and of many other organic substances such as naphthalene, when brought into contact with very hot molten sulphur, react chemically and form dark colored products which have a tendency to darken the sulphur. This method of producing a black sulphur, however, is unsatisfactory for the reason that it is very difficult to control the chemical action which continues for sometime after the sulphur solidifies, giving rise not only to a very porous structure, but to noxious and ill-smelling reaction products. Furthermore, this method does not produce a jet black sulphur.

It is the object of the present invention to avoid the difficulties mentioned and to provide a simple and inexpensive method of coloring sulphur and various colored sulphur products which can be utilized for a large variety of purposes.

I have discovered that certain dye-stuffs and other chemicals are soluble in sulphur and produce, when added to sulphur, homogeneous mixtures of a uniform color, which may be used for any purpose to which sulphur itself may be employed. The addition of these dye-stuffs or chemicals to sulphur produces new compositions of matter of great utility.

I do not wish to limit this invention to the use of soluble colors since certain intermediates, when in contact with molten sulphur at proper temperatures, produce colors that are in turn sulphur-soluble. For example, I have found that a small quantity of meta-toluylene-diamine is miscible and reacts with molten sulphur at a temperature of about 200° C. and forms a soluble yellow or orange color quite different from the original color of the sulphur. Similarly, a small quantity of para nitro-phenol produces a rich brown sulphur soluble color, while sodium paranitrophenolate produces a sulphur-soluble black. Although dinitrochlorobenzene may be substituted, the latter has the disadvantage of being very toxic.

I prefer, however, to employ certain colors or dyestuffs which do not react with the molten sulphur and which in themselves are capable of dissolving therein and imparting brilliant shades of color to the sulphur, sulphur composition, sulphur-containing substances or materials impregnated with sulphur.

As examples of such colors, specific mention is made of the azo group of dyestuffs. Apparently those dyestuffs which are soluble in oil give the best results when used for the coloring of sulphur, but this is not always the case. I have determined the solubility in sulphur of the following dye-stuffs and as a matter of convenience, I have used their commercial designations, preceded by their color index numbers:

C. I.
258 Oil sudan IV
248 Oil red L-1471
73 Oil scarlet X-9995
23 Oil orange #7078
23 Oil orange Y-293
17 Oil yellow T
19 Oil yellow PHW
15 Oil yellow 7463
864 Nigrosine base D 8880
864 Nigrosine base HM
81 Oil brown H-8808
82 Oil red Y-292
657 Malachite green base
24 Oil red I-1289

In carrying out the invention the desired quantity of sulphur is melted in a suitable receptacle and a sufficient quantity of the dye or intermediate is added to produce the required color or shade. The colored sulphur may be utilized at once or permitted to cool and harden. The color is not affected by the cooling and remelting of the sulphur. The colored sulphur can be utilized in various ways.

There are many practical applications and uses for sulphur colored with a sulphur soluble dye-stuff, and I have discovered that such colored sulphurs may be melted repeatedly without any modification of color and that the dye-stuff necessarily penetrates any material which the sulphur is capable of impregnating. In other words, I have discovered a new vehicle for the carrying of various colors into many substances which heretofore could not be colored satisfactorily.

Various materials such as sandstone, Portland cement concrete, paper and fibrous materials generally, may be colored in various ways, but there are many disadvantages to all methods heretofore employed. If mineral pigments are simply admixed with Portland cement concrete, they are exposed to all the destructive agencies to which the concrete itself is subject, and they therefore fade or are washed out. Water-soluble colors cannot be employed for the obvious reason that they are removed when the stone, concrete or other material is exposed to moisture. Similarly, colors carried in oil are impractical to employ because of the very nature of the vehicle which oxidizes upon exposure to air and which is of a migratory nature. Waxes, gums, and similar substances, in which colors may be soluble, are impossible to use for the purpose of the present invention because they are sensitive to chemical change and their physical properties are such as to preclude their employment. They are unctuous, collect dirt and dust and slowly exude from the material into which they may be injected. In other words, they possess the quality of slowly creeping and flowing, especially under changes of temperature.

The use of my vehicle, which is sulphur containing a sulphur-soluble coloring material, overcomes these deficiencies and is different from any medium heretofore employed. Sulphur is in itself moisture-proof, wet-resistant and acid-proof, of high dielectric strength and a crystalline solid which, when used as an impregnant for materials, increases their strength many fold both under tension and compression, and at the same time serves as a vehicle for my sulphur-soluble colors which it subsequently protects from practically all destructive and deteriorating agencies.

By this method, such materials as Portland cement mortar and concrete, limestone, sandstone, wood, paper and fibrous materials generally, may be colored throughout their mass by immersion in molten sulphur carrying a sulphur-soluble dye-stuff either by open tank treatment or with vacuum and/or pressure. I have applied the colored sulphur product to many species of wood, several varieties of sandstone and limestone, the usual mixes of Portland cement concrete and a wide range of pulp, paper and other fibrous materials such as Celotex and asbestos products. Various clays and the products thereof, both in a burned and unburned condition, may be treated in accordance with this invention, to impart attractive shades of permanent color.

This invention is also applicable to the coloring of sulphur admixed with inert solids such as sand, coke-dust, wood flour and other fillers, but is equally applicable to mixtures of sulphur and certain gums, waxes, resins and other organic compounds as fuse and admix with molten sulphur. Under these may be mentioned naphthalene, halowax and cumar.

A sufficient number of examples have been cited to indicate the practical application of this invention, but it is distinctly understood that it is not limited to any particular product but comprises a method not only of coloring sulphur, sulphur compositions, but also sulphur-containing substances.

I claim:—

1. As a new composition of matter, sulphur colored with a sulphur-soluble dyeing material.

2. As a new composition of matter, sulphur colored with a sulphur-soluble organic dye.

3. As a new composition of matter, sulphur colored with a sulphur-soluble organic dye of the Azo group.

4. As a new composition of matter, sulphur having a uniformly distributed, non-separable coloring constituent embodied therein.

5. As a new composition of matter, sulphur having a uniformly distributed, soluble coloring constituent embodied therein.

In testimony whereof I affix my signature.

WILLIAM HOFFMAN KOBBE.